US010412340B2

(12) United States Patent
Matsunaga

(10) Patent No.: US 10,412,340 B2
(45) Date of Patent: Sep. 10, 2019

(54) RECORDING DEVICE AND MULTIPLEXING METHOD

(71) Applicant: JVC KENWOOD Corporation, Yokohama-shi, Kanagawa (JP)

(72) Inventor: Yoshihiro Matsunaga, Yokohama (JP)

(73) Assignee: JVCKENWOOD Corporation, Yokohama-shi, Kanagawa (JP)

( * ) Notice: Subject to any disclaimer, the term of this patent is extended or adjusted under 35 U.S.C. 154(b) by 132 days.

(21) Appl. No.: 15/663,244

(22) Filed: Jul. 28, 2017

(65) Prior Publication Data

US 2017/0332039 A1 Nov. 16, 2017

Related U.S. Application Data

(63) Continuation of application No. PCT/JP2015/006274, filed on Dec. 16, 2015.

(30) Foreign Application Priority Data

Jan. 30, 2015 (JP) .................................. 2015-017338

(51) Int. Cl.
| | | |
|---|---|---|
| *H04N 5/92* | (2006.01) | |
| *G11B 20/10* | (2006.01) | |
| *H04N 5/77* | (2006.01) | |
| *H04N 9/804* | (2006.01) | |
| *H04N 9/82* | (2006.01) | |

(52) U.S. Cl.
CPC ........... *H04N 5/9203* (2013.01); *G11B 20/10* (2013.01); *H04N 5/772* (2013.01); *H04N 9/8042* (2013.01); *H04N 9/8211* (2013.01)

(58) Field of Classification Search
CPC ....... H04N 5/9203; H04N 5/772; G11B 20/10
See application file for complete search history.

(56) References Cited

U.S. PATENT DOCUMENTS

| | | | | |
|---|---|---|---|---|
| 2006/0140280 A1* | 6/2006 | Okada | ................. | H04N 5/9265 |
| | | | | 375/240.28 |
| 2010/0034517 A1* | 2/2010 | Maeda | ................. | G11B 27/034 |
| | | | | 386/248 |

FOREIGN PATENT DOCUMENTS

| | | |
|---|---|---|
| JP | 2005-006095 A | 1/2005 |
| JP | 2008-054159 A | 3/2008 |

* cited by examiner

*Primary Examiner* — Girumsew Wendmagegn
(74) *Attorney, Agent, or Firm* — Procopio, Cory, Hargreaves & Savitch LLP

(57) ABSTRACT

A recording device includes a video encoding unit configured to compress and then encode video data pieces by a first unit of data, an audio encoding unit configured to compress and then encode audio data pieces in a second unit of data, and a multiplexing unit. The multiplexing unit selects the audio data pieces by the second unit of data from the audio data pieces in such a way that an amount of temporal shift between the respective video data pieces and the audio data pieces corresponding to the respective video data pieces will become less than or equal to a time length of the second unit of data and then multiplexes the selected audio data pieces with the video data.

5 Claims, 4 Drawing Sheets

RECORDING DEVICE AND MULTIPLEXING METHOD

CROSS REFERENCE TO RELATED APPLICATION

This application is based upon and claims the benefit of priority from Japanese Patent Application No. 2015-017338, filed on Jan. 30, 2015, the entire contents of which are hereby incorporated by reference.

BACKGROUND

The present invention relates to a recording device and a multiplexing method.

A technique called clip continuous recording is well known in imaging devices such as video cameras. With this technique, when a pair of record instructions made up of a record start instruction and a record stop instruction is repeatedly provided for several times at time intervals, data pieces corresponding to the several record instructions is aggregated to create one piece of record data. Note that the record data is also referred to as a clip or a stream. Video data pieces corresponding to a period from the record start instruction until the record stop instruction are multiplexed with audio data pieces corresponding to the video data pieces as one piece of record data. There has been a demand for clip continuous recording in compressed data compliant with standards such as AVCHD (registered trademark).

In the clip continuous recording, it is desired that a temporal shift between the video data pieces and the audio data pieces, which will be multiplexed, be reduced in order to synchronize the video data pieces with the audio data pieces.

Japanese Unexamined Patent Application Publication No. 2008-54159 discloses a technique for temporally matching encoded video data pieces with encoded audio data pieces when an encoding process is suspended and resumed.

SUMMARY

However, in the technique disclosed in Japanese Unexamined Patent Application Publication No. 2008-54159, data pieces to be multiplexed are not compressed data pieces, and it is still desired to multiplex compressed data pieces for clip continuous recording.

In an exemplary aspect, a recording device includes: a video encoding unit configured to compress and then encode video data pieces by a first unit of data; an audio encoding unit configured to compress and then encode audio data pieces in a second unit of data, a time length of the second unit of data being different from that of the first unit of data; and a multiplexing unit configured to, when a pair of record instructions made up of a record start instruction and a record stop instruction is repeatedly provided at time intervals, couple the respective video data pieces, which have been encoded by the video encoding unit, corresponding to a period from the record start instruction to the record stop instruction, and also multiplex the respective video data pieces with the audio data pieces, which have been encoded by the audio encoding unit and which correspond to the respective video data pieces, as one piece of record data. The audio encoding unit continues the encoding at least from a first one of the record instruction until a last one of the record instruction, and the multiplexing unit selects the audio data pieces by the second unit of data from the audio data pieces, which have been encoded by the audio encoding unit, in such a way that an amount of temporal shift between the respective video data pieces and the audio data pieces, which have been encoded by the audio encoding unit and which correspond to the respective video data pieces, will become less than or equal to the time length of the second unit of data and then multiplexes the selected audio data pieces with the video data pieces.

In another exemplary aspect, a multiplexing method includes: an video coding step for compressing and then encoding video data pieces by a first unit of data; an audio coding step for compressing and then encoding audio data pieces by a second unit of data, a time length of the second unit of data being different from that of the first unit of data; and a multiplexing step, when a pair of record instructions made up of a record start instruction and a record stop instruction is repeatedly provided at time intervals, for coupling the respective encoded video data pieces corresponding to a period from the record start instruction to the record stop instruction, and also multiplexing the respective video data pieces with the encoded audio data pieces corresponding to the respective video data pieces as one piece of record data. In the audio encoding step, the encoding is continued at least from a first one of the record instruction until a last one of the record instruction, and in the multiplexing step, the audio data pieces are selected by the second unit of data from the encoded audio data pieces in such a way that an amount of temporal shift between the respective video data pieces and the audio data pieces, which have been encoded in the audio coding step and which correspond to the respective video data pieces, will become less than or equal to the time length of the second unit of data and then the selected audio data pieces are multiplexed with the video data pieces.

DETAILED DESCRIPTION

Hereinafter, an exemplary embodiment of the present invention will be described with reference to the drawings.

Figure 1:
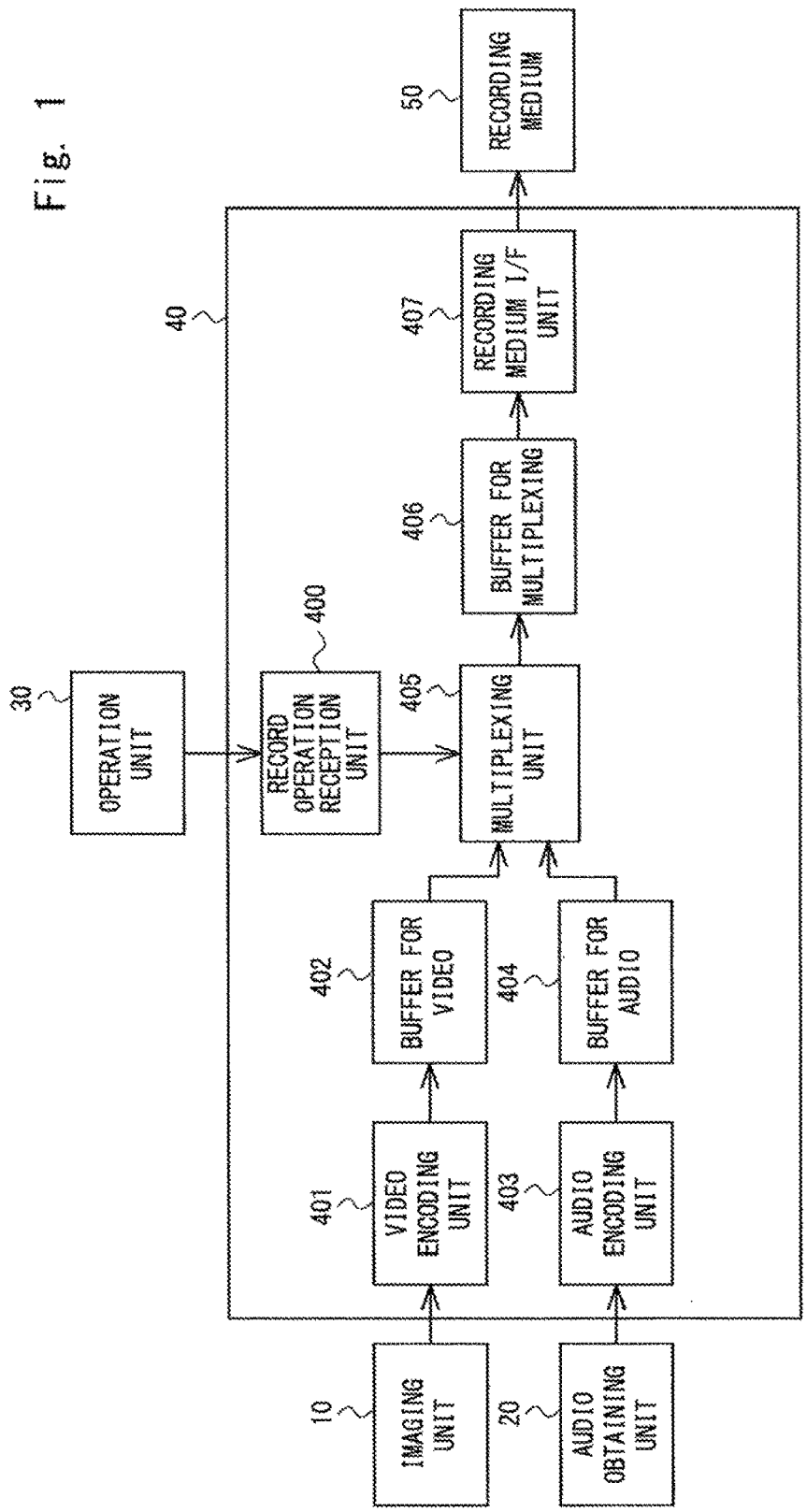
FIG. 1 is a block diagram showing a configuration of an imaging device according to an exemplary embodiment.

FIG. 1 is a block diagram showing a configuration of an imaging device 1 according to the exemplary embodiment of the present invention. As shown in FIG. 1, the imaging device 1 includes an imaging unit 10, an audio obtaining unit 20, an operation unit 30, a recording device 40, and a recording medium 50.

The imaging unit 10 obtains video data. To be more specific, the imaging unit 10 obtains video data by an imaging sensor such as a CCD (Charge Coupled Device) image sensor and a CMOS (Complementary Metal Oxide Semiconductor) image sensor. The imaging unit 10 outputs the obtained video data to a video encoding unit 401, which will be described later.

The audio obtaining unit 20 obtains audio data. To be more specific, the audio obtaining unit 20 obtains audio data by, for example, a microphone. The audio obtaining unit 20 outputs the obtained audio data to an audio encoding unit 403, which will be described later.

The operation unit 30 includes a button, a touch panel, and the like and receives various instructions from a user including a pair of record instructions made up of a record start instruction and a record stop instruction. Note that in the clip continuous recording, a record stop instruction in a last record instruction may be referred to as a record end instruction. Further, record stop instructions other than the record end instruction may be referred to as record suspension instructions. In response to the record instruction, the operation unit 30 notifies a record operation reception unit 400, which will be described later, of the record instruction.

In this exemplary embodiment, the operation unit 30 includes a record button (not shown). The user presses the record button in order to issue a record start instruction and a record stop instruction. For example, when the user presses the record button, it will issue a record start instruction. When the user presses the record button again, it will issue a record stop instruction. When the user presses and holds the record button, it will issue a record end instruction.

As shown in FIG. 1, the recording device 40 includes the record operation reception unit 400, the video encoding unit 401, a buffer for video 402, the audio encoding unit 403, a buffer for audio 404, a multiplexing unit 405, a buffer for multiplexing 406, and a recording medium interface (I/F) unit 407. The buffer for video 402, the buffer for audio 404, and the buffer for multiplexing 406 are each composed of an FIFO (first-in first-out) RAM (Random Access Memory) or a Ring buffer RAM. Further, the record operation reception unit 400, the video encoding unit 401, the audio encoding unit 403, and the multiplexing unit 405 may each be a piece of hardware or may be achieved by a program(s) executed by a computer.

The record operation reception unit 400 receives the record start instruction and the record stop instruction received by the operation unit 30 and notifies the multiplexing unit 405 of the instructions.

The video encoding unit 401 compresses video data output by the imaging unit 10 and then encodes the compressed video data by a predetermined unit of data. For example, the video encoding unit 401 compresses video data by a predetermined format such as MPEG-4 AVC/H.264 and then encodes the video data. In this exemplary embodiment, the video encoding unit 401 performs the encoding by the unit of data including 15 frames. Note that in this exemplary embodiment, a video frame rate is 29.97 Hz, and a length of time for one frame is 33.3 milliseconds. A collection of 15 frames is treated as one GOP (Group Of Pictures) unit. That is, a length of time for one GOP is 499.5 milliseconds. Therefore, the video encoding unit 401 encodes video data by the unit of video data equivalent to 499.5 milliseconds. That is, the video encoding unit 401 encodes the video data by the GOP unit that includes 15 frames. The video encoding unit 401 outputs the encoded video data to the buffer for video 402. Hereinafter, the unit of data in the encoding by the video encoding unit 401 may be referred to as a first unit of data.

Note that in this exemplary embodiment, the video encoding unit 401 continues the encoding regardless of the record stop instruction at least during the clip continuous recording, namely, from the first record instruction to the last record instruction.

The buffer for video 402 temporarily stores the encoded video data output by the video encoding unit 401.

The audio encoding unit 403 compresses the audio data output by the audio obtaining unit 20 and then encodes the compressed audio data by a predetermined unit of data. For example, the audio encoding unit 403 compresses audio data by a predetermined format such as Dolby Digital and then encodes the audio data. Hereinafter, the above unit of data in the encoding by the audio encoding unit 403 may be referred to as a second unit of data. A time length for the second unit of data differs from a time length for the above first unit of data. In this exemplary embodiment, although the audio encoding unit 403 encodes the audio data by one frame, which is the second unit of data, one frame in Dolby Digital includes audio data equivalent to 32 milliseconds. Therefore, in this exemplary embodiment, the video encoding unit 401 encodes the video data by the unit of video data equivalent to 499.5 milliseconds, and the audio encoding unit 403 encodes the audio data by the unit of audio data equivalent to 32 milliseconds. The audio encoding unit 403 outputs the encoded audio data to the buffer for audio 404.

Note that in this exemplary embodiment, the audio encoding unit 403 continues the encoding regardless of the record stop instruction at least during the clip continuous recording, namely, from the first record instruction to the last record instruction.

The buffer for audio 404 temporarily stores the encoded audio data output by the audio encoding unit 403.

The multiplexing unit 405 multiplexes the encoded video data stored in the buffer for video 402 with the encoded audio data stored in the buffer for audio 404 by a predetermined format. In this exemplary embodiment, MPEG-TS (Transport Stream) is employed as the predetermined format, and the multiplexing unit 405 performs multiplexing in accordance with MPEG-TS. The multiplexing unit 405 outputs the generated multiplexed data to the buffer for multiplexing 406. Note that details of the multiplexing unit 405 will be described later.

The buffer for multiplexing 406 temporarily stores the multiplexed data generated by the multiplexing unit 405.

The recording medium I/F unit 407 is an interface for recording the multiplexed data stored in the buffer for multiplexing 406 in the recording medium 50. The recording medium 50 is a randomly accessible recording medium such as a semiconductor memory card, an optical disk, a hard disk, or the like. The recording medium 50 may be, for example, a semiconductor memory card mounted on a slot.

The multiplexing unit 405 performs the multiplexing for the clip continuous recording in the following manner. When a pair of record instructions made up of a record start instruction and a record stop instruction is repeated at time intervals, the multiplexing unit 405 couples encoded video data pieces corresponding to periods from the record start instructions and the record stop instructions, respectively, and also multiplexes the video data pieces with the corresponding encoded audio data pieces as one piece of record data. To be more specific, the multiplexing unit 405 selects encoded video data pieces, which will be recorded, from the encoded video data pieces accumulated in the buffer for video 402 based on timings of the record start instruction and the record stop instruction that are sent from the record operation reception unit 400. The selection of the encoded video data pieces is performed by the first unit of data. The multiplexing unit 405 further selects encoded audio data pieces from the encoded audio data pieces accumulated in the buffer for audio 404 as the encoded audio data pieces corresponding to the respective video data pieces. The selection of the encoded audio data pieces is performed by the second unit of data.

As described above, since the time length of the first unit of data differs from the time length of the second unit of data, a temporal shift is generated between the video data pieces and the audio data pieces in record data in the case of the clip continuous recording. In order to reduce this temporal shift, the multiplexing unit 405 performs multiplexing in the following manner in this exemplary embodiment.

The multiplexing unit 405 selects the audio data piece by the second unit of data from the audio data pieces that have been encoded by the second unit of data in such a way that an amount of a temporal shift between the encoded video data pieces corresponding to a period from the record start instruction to the record stop instructions and the encoded audio data pieces corresponding to the respective video data pieces will become less than or equal to the time length of the second unit of data and then multiplexes the selected audio data pieces with the video data pieces.

More specifically, in this exemplary embodiment, the multiplexing unit 405 performs the multiplexing in the following manner. A first reference point is a starting point for encoded video data pieces corresponding to a focused record instruction. Further, a second reference point is an ending point for the encoded video data pieces corresponding to the focused record instruction. The multiplexing unit 405 determines a leading edge of the audio data piece that has been shifted in time by an amount of accumulated offset in such a way that a difference between a starting point of the audio data pieces encoded by the second unit of data of the leading edge of the audio data pieces corresponding to the focused record instruction and the first reference point will become less than or equal to half of the time length of the second unit of data. Note that shifting times of the audio data pieces indicates changing the original temporal correspondence relationship between the audio data pieces and the video data pieces and then matching the audio data pieces with the video data pieces, respectively. The multiplexing unit 405 determines a trailing edge of the audio data piece that has been shifted in time by the amount of accumulated offset in such a way that a difference between an ending point of the audio data piece encoded by the second unit of data of the trailing edge of the encoded audio data pieces corresponding to the focused record instruction and the second reference point will become less than or equal to half of the time length of the second unit of data. The amount of offset can be defined as follows. An initial value of the amount of offset is a difference between a leading edge of encoded video data pieces and a leading edge of encoded audio data pieces at the time of starting a first record. Every time the leading edge of the encoded data pieces corresponding to the focused record instruction is determined, a difference between a time length from a point corresponding to a first record start instruction and the determined leading edge and a time length from the point corresponding to the first record start instruction to the first reference point is added to the amount of offset. Further, every time the trailing edge of the encoded data pieces corresponding to the focused record instruction is determined, a difference between a time length from the point corresponding to the first record start instruction and the determined trailing end and a time length from the point corresponding to the first record start instruction to the second reference point is added to the amount of offset. Note that the added value may be a positive value instead of a negative value. Accordingly, the amount of accumulated offset is a positive or a negative value.

Hereinafter, a specific example will be described.

Figure 2:
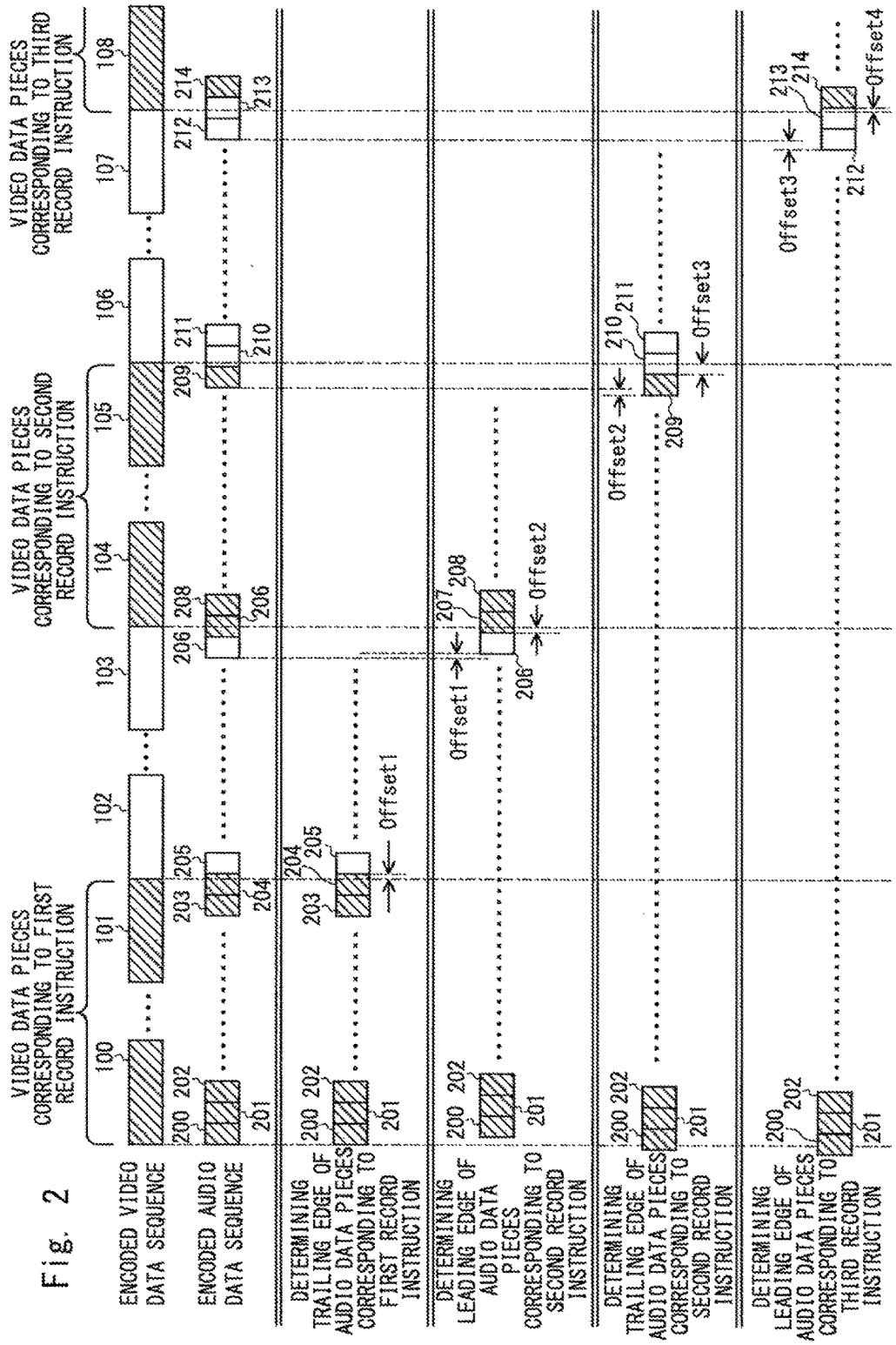
FIG. 2 is a schematic diagram showing video data pieces and audio data pieces selected when a multiplexing unit according to the exemplary embodiment performs a multiplexing process.

FIG. 2 is a schematic diagram showing video data pieces and audio data pieces selected in a multiplexing process by the multiplexing unit 405. To be more specific, in FIG. 2, in the first row, an encoded video data sequence and an encoded audio data sequence are shown. That is, the first row shows examples of encoded video data pieces accumulated in the buffer for video 402 and encoded audio data pieces accumulated in the buffer for audio 404. In the second row, a method for determining an audio data piece encoded by the second unit of data, which should be a trailing edge, when audio data pieces encoded by the second unit of data to be multiplexed are selected from the buffer for audio 404 as audio data pieces corresponding to a first record instruction is explained. In the third row, a method for determining an audio data piece encoded by the second unit of data, which should be a leading edge, when audio data pieces encoded by the second unit of data to be multiplexed are selected from the buffer for audio 404 as audio data pieces corresponding to a second record instruction is explained. In the fourth row, a method for determining an audio data piece encoded by the second unit of data, which should be trailing edge, when audio data pieces encoded by the second unit of data to be multiplexed are selected from the buffer for audio 404 as audio data pieces corresponding to the second record instruction is explained. In the fifth row, a method for determining an audio data piece encoded by the second unit of data, which should be a leading edge, when audio data pieces encoded by the second unit of data to be multiplexed are selected from the buffer for audio 404 as audio data pieces corresponding to a third record instruction is explained.

Note that in FIG. 2, the respective rectangles represent video data pieces encoded by the first unit of data or audio data pieces encoded by the second unit of data, and the rectangles in a hatched pattern represent data pieces to be selected, which will be multiplexed.

The examples shown in FIG. 2 will be described in more detail below.

A video data piece 100 is a leading edge of video data pieces corresponding to the first record instruction. A video data piece 101 is a trailing edge of the video data pieces corresponding to the first record instruction. A video data piece 102 is a video data piece temporally following the video data piece 101. A video data piece 103 is a temporally previous video data piece of the video data piece 104. The video data piece 104 is a leading edge of the video data pieces corresponding to the second record instruction. A video data piece 105 is a trailing edge of the video data pieces corresponding to the second record instruction. A video data piece 106 is a video data piece temporally following the video data piece 105. A video data piece 107 is a temporally previous video data piece of the video data piece 108. The video data piece 108 is a leading edge of the video data pieces corresponding to the third record instruction.

Audio data pieces 200 to 214 represent encoded audio data pieces obtained during the clip continuous recording. In particular, the audio data piece 200 is an audio data piece at the time of the first record start instruction.

The selection of data pieces to be multiplexed by the multiplexing unit 405 will be described with reference to FIG. 2 step by step. In this exemplary embodiment, as described above, the multiplexing unit 405 selects data pieces to be multiplexed by using the amount of offset. Note that in the examples shown in FIG. 2, an initial value of the amount of offset is zero. Firstly, the multiplexing unit 405 selects encoded audio data pieces corresponding to the video data pieces corresponding to the first record instruction. At this time, a starting point of the video data piece 100 will become the first reference point, and an ending point of the video data piece 101 will become the second reference point. As the amount of offset is zero, the multiplexing unit 405 does not temporally shift the audio data piece and determines a leading edge of the audio data pieces in such a way that a difference between a starting point of the audio data piece encoded by the second unit of data of the leading edge of the audio data pieces corresponding to the first record instruction and the first reference point will become less than or equal to half of the time length of the second unit of data. Note that in this exemplary embodiment, the half of the time length of the second unit of data is 16 milliseconds. Accordingly, as shown in the second row of FIG. 2, the multiplexing unit 405 determines the audio data piece 200 to be the leading edge of the audio data pieces corresponding to the first record instruction. Note that there is no difference between a time length from a point corresponding to the first record start instruction, namely, the starting point of the video data piece 100 to the audio data piece 200, which is the determined leading edge of the audio data pieces and a time length from the point corresponding to the first record start instruction, namely, the starting point of the video data piece 100 to the first reference point. Thus, after the leading edge of the audio data pieces corresponding to the first record instruction is determined, nothing will be added to the amount of offset.

Next, as the amount of offset is still zero, the multiplexing unit 405 does not temporally shift the audio data piece and determines a trailing edge of the audio data pieces in such a way that a difference between an ending point of the audio data piece encoded by the second unit of data of the trailing edge of the audio data pieces corresponding to the first record instruction and the second reference point will become less than or equal to half of the time length of the second unit of data. As shown in the second row of FIG. 2, there are audio data pieces 203 to 205 as audio data pieces near the second reference point. However, only in the audio data piece 204, a difference between an ending point and the second reference point will become less than or equal to half of the time length of the second unit of data. Accordingly, the multiplexing unit 405 determines the audio data piece 204 to be the trailing edge of the audio data pieces corresponding to the first record instruction.

When the trailing edge of the audio data pieces is determined, the amount of offset is updated. To be more specific, the amount of offset is updated by adding to it a difference between a time length from the point corresponding to the first record start instruction, namely, the starting point of the video data piece 100, to the ending point of the audio data piece 204, which is the determined trailing edge of the audio data pieces and a time length from the point corresponding to the first record instruction to the second reference point. The updated amount of offset is referred to as Offset1. Note that as shown in the second row of FIG. 2, Offset1 corresponds to a difference between the ending point of the audio data piece 204 and the second reference point.

Next, the multiplexing unit 405 selects the encoded audio data pieces corresponding to the video data pieces corresponding to the second record instruction. At this time, a starting point of the video data piece 104 will become the first reference point, and an ending point of the video data piece 105 will become the second reference point. The multiplexing unit 405 determines a leading edge of the audio data piece that has been shifted in time by the amount of accumulated offset, namely, by Offset1, in such a way that a difference between a starting point of the audio data piece encoded by the second unit of data of the leading edge of the audio data pieces corresponding to the second record instruction and the first reference point will become less than or equal to half of the time length of the second unit of data. Note that in this example, as shown in the third row of FIG. 2, the audio data sequence is shifted by Offset1 in the direction in which data is temporally delayed, i.e., in the right direction of FIG. 2. The direction in which audio data sequence is shifted is determined by whether the value of the amount of accumulated offset is positive or negative. In this exemplary embodiment, when the value of the amount of accumulated offset is positive, the audio data piece is shifted in the direction in which data is delayed when data pieces to be multiplexed are selected.

As shown in the third row of FIG. 2, there are audio data pieces 206 to 208 as audio data pieces near the first reference point. However, only in the audio data piece 207, a difference between a starting point and the first reference point will become less than or equal to half of the time length of the second unit of data. Accordingly, the multiplexing unit 405 determines the audio data piece 207 to be a leading edge of the audio data pieces corresponding to the second record instruction.

When the leading edge of the audio data pieces is determined, the amount of offset is updated. To be more specific, the amount of offset is updated by adding to it a difference between a time length from the starting point of the video data piece 100 to the starting point of the audio data piece 207 and a time length from the starting point of the video data piece 100 to the first reference point. The updated amount of offset is referred to as Offset2. Note that as shown in the third row of FIG. 2, Offset2 corresponds to a difference between the starting point of the audio data piece 207 and the first reference point.

Next, the multiplexing unit 405 determines a trailing edge of the audio data piece that has been shifted in time by the amount of accumulated offset, namely, by Offset2, in such a way that a difference between an ending point of the audio data piece encoded by the second unit of data of a trailing edge of the audio data pieces corresponding to the second record instruction and the second reference point will become less than or equal to half of the time length of the second unit of data. Note that in this example, as shown in the fourth row of FIG. 2, the audio data sequence is shifted by Offset2 in the direction in which data is temporally advanced, i.e., in the left direction of FIG. 2.

As shown in the fourth row of FIG. 2, there are audio data pieces 209 to 211 as audio data pieces near the second reference point. However, only in the audio data piece 209, a difference between an ending point and the second reference point will become less than or equal to half of the time length of the second unit of data. Accordingly, the multiplexing unit 405 determines the audio data piece 209 to be a trailing edge of the audio data pieces corresponding to the second record instruction.

When the trailing edge of the audio data pieces is determined, the amount of offset is updated. To be more specific, the amount of offset is updated by adding to it a difference between a time length from the starting point of the video data piece 100 to the ending point of the audio data piece 209 and a time length from the starting point of the video data piece 100 to the second reference point. The updated amount of offset is referred to as Offset3. Note that as shown in the fourth row of FIG. 2, Offset3 corresponds to a difference between the ending point of the audio data piece 209 and the second reference point.

Next, the multiplexing unit 405 selects the encoded audio data pieces corresponding to the video data pieces corresponding to the third record instruction. At this time, a starting point of the video data piece 108 will become the first reference point. The multiplexing unit 405 determines a leading edge of the audio data piece that has been shifted in time by the amount of accumulated offset, namely, by Offset3, in such a way that a difference between a starting of the audio data piece encoded by the second unit of data of the leading edge of the audio data pieces corresponding to the third record instruction and the first reference point will become less than or equal to half of the time length of the second unit of data. Note that in this example, as shown in the fourth row of FIG. 2, the audio data sequence is shifted by Offset3 in the direction in which data is temporally advanced, i.e., in the left direction of FIG. 2.

As shown in the fifth row of FIG. 2, there are audio data pieces 212 to 214 as audio data pieces near the first reference point. However, only in the audio data piece 214, a difference between a starting point and the first reference point will become less than or equal to half of the time length of the second unit of data. Accordingly, the multiplexing unit 405 determines the audio data piece 214 to be a leading edge of the audio data pieces corresponding to the third record instruction.

When the leading edge of the audio data pieces is determined, the amount of offset is updated. To be more specific, the amount of offset is updated by adding to it a difference between a time length from the starting point of the video data piece 100 to the starting point of the audio data piece 214 and a time length from the starting point of the video data piece 100 to the first reference point. The updated amount of offset is referred to as Offset4. Note that as shown in the fifth row of FIG. 2, Offset4 corresponds to a difference between the starting point of the audio data piece 214 and the first reference point.

After this, in a manner similar to the above, a trailing edge of the audio data pieces corresponding to the third record instruction is determined. The multiplexing unit 405 repeats the selection of video data pieces and audio data pieces according to the record instructions until the record stop instruction in the last record instruction, namely, the record end instruction, is provided during the clip continuous recording. Note that when the record end instruction is provided, the multiplexing unit 405 may determine, for example, a trailing edge of the audio data pieces corresponding to the last record instruction in such a way that a time length of all audio data pieces to be multiplexed will become longer than a time length of all video data pieces to be multiplexed instead of using the above selection method.

Figure 3:
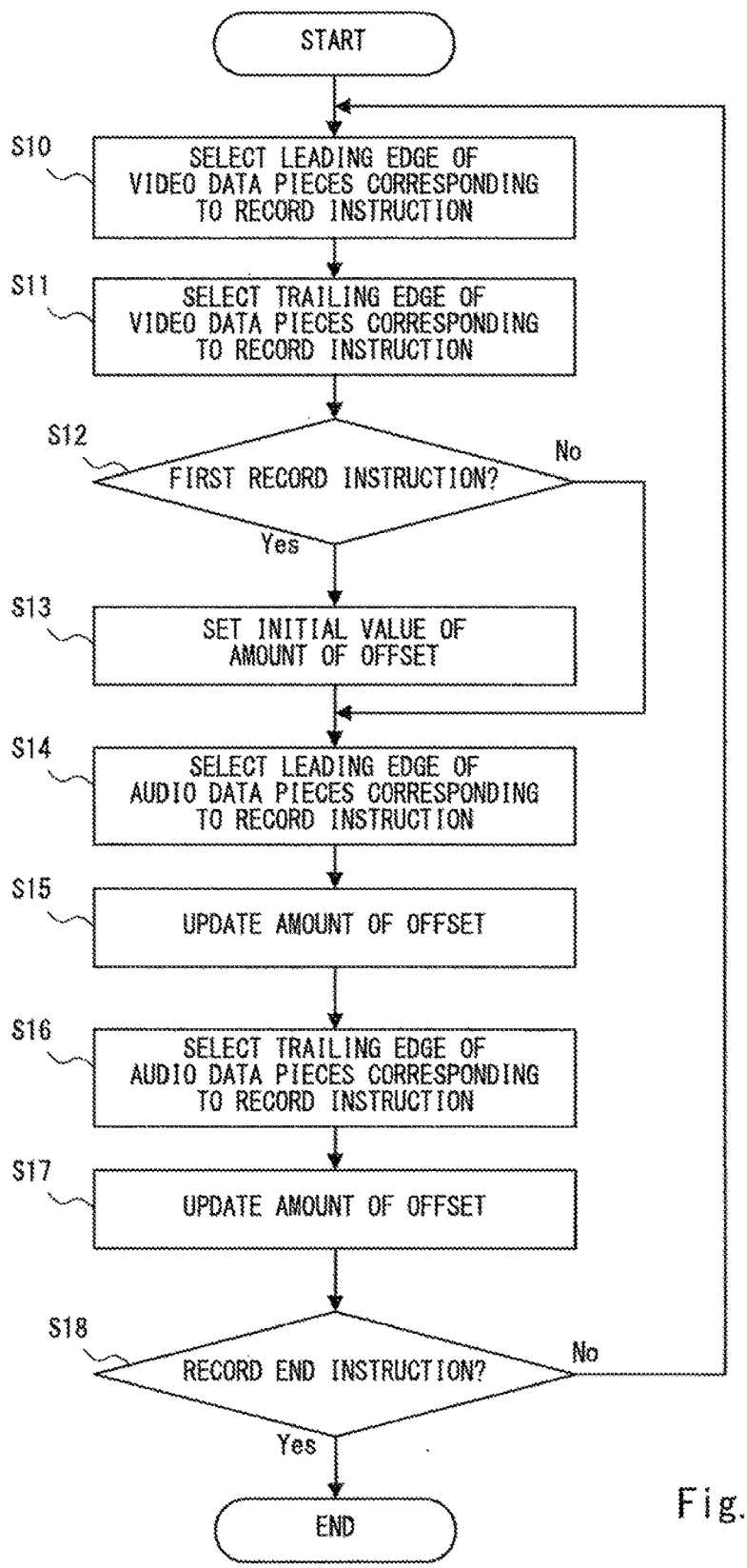
FIG. 3 is a flowchart showing an example of a flow of an operation of a process for selecting data pieces to be multiplexed performed by the multiplexing unit according to the exemplary embodiment.

A flow of an operation of a process for selecting data pieces to be multiplexed by the multiplexing unit 405 will be described. FIG. 3 is a flowchart showing an example of the flow of the process for selecting the data pieces to be multiplexed by the multiplexing unit 405.

In the step 10 (S10), the multiplexing unit 405 selects a leading edge of video data pieces corresponding to a record instruction. More specifically, the multiplexing unit 405 specifies a video data piece to be the leading edge of the video data pieces according to an instruction timing of the record start instruction sent from the record operation reception unit 400.

In the step 11 (S11), the multiplexing unit 405 selects a trailing edge of the video data pieces corresponding to the record instruction. To be more specific, the multiplexing unit 405 specifies a video data piece to be the trailing edge according to an instruction timing of the record stop instruction sent from the record operation reception unit 400.

In the step 12 (S12), the multiplexing unit 405 evaluates as to whether or not the record instruction sent from the record operation reception unit 400 is a first record instruction in the clip continuous recording. If it is the first instruction, the process proceeds to the step 13. If it is not the first instruction, the process proceeds to the step 14.

In the step 13 (S13), the multiplexing unit 405 specifies an initial value of the amount of offset. For example, the multiplexing unit 405 specifies zero as the initial value.

In the step 14 (S14), the multiplexing unit 405 selects a leading edge of the audio data pieces corresponding to the record instruction. In the step 15 (S15), the multiplexing unit 405 updates the amount of offset based on a result of the selection of the leading edge of the audio data pieces.

In the step 16 (S16), the multiplexing unit 405 selects a trailing edge of the audio data pieces corresponding to the record instruction. In the step 17 (S17), the multiplexing unit 405 updates the amount of offset based on a result of the selection of the trailing edge. Note that when the record stop instruction sent from the record operation reception unit 400 is the record end instruction, the multiplexing unit 405 determines a trailing edge of the audio data pieces corresponding to the last record instruction in such a way that a time length of all audio data pieces to be multiplexed will become longer than a time length of all video data pieces to be multiplexed.

In the step 18 (S18), the multiplexing unit 405 evaluates as to whether or not the record stop instruction sent from the record operation reception unit 400 is the record end instruction. If it is the record end instruction, the multiplexing unit 405 ends the process for selecting the data pieces to be multiplexed. If it is not the record end instruction, the process returns to the step 10.

Figure 4:
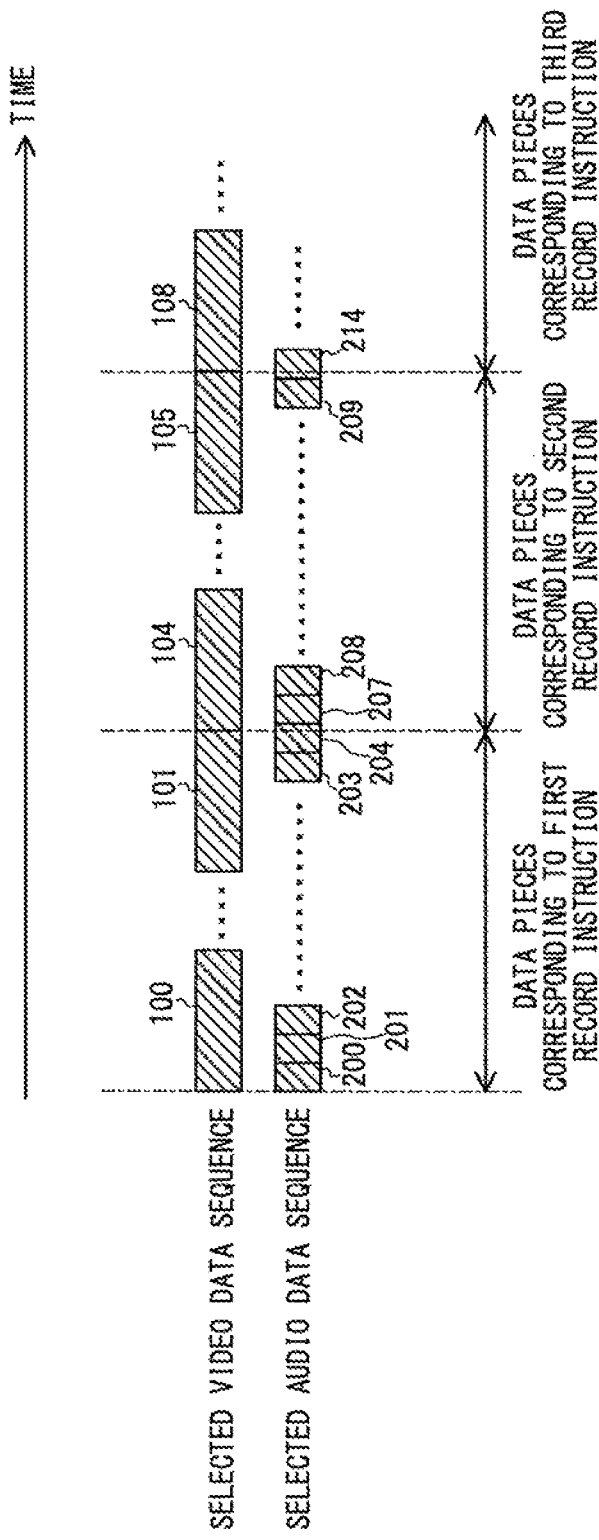
FIG. 4 is a schematic diagram showing a temporal correspondence relationship between the video data pieces and the audio data pieces selected based on the process for selecting the data pieces to be multiplexed according to the exemplary embodiment.

FIG. 4 is a schematic diagram showing a temporal correspondence relationship between the video data pieces and the audio data pieces selected in the above process for selecting the data pieces to the multiplexed. In the process for selecting the data pieces to be multiplexed according to this exemplary embodiment, shifts between joints of the video data pieces and joints of the audio data pieces between respective operation instructions are each a length of time of the second unit of data at maximum. Accordingly, the record data created by the clip continuous recording can have a temporal shift between audio and video reduced to less than or equal to the length of time of the second unit of data in any time period. That is, according to the recording device 40, it is possible to multiplex compressed data for clip continuous recording while reducing a temporal shift between audio and video.

Although the process for selecting the data pieces to be multiplexed by the multiplexing unit 405 has been described so far, a specific calculation method for achieving the above selection process will be described below. The following calculation method is an example, and the selection process may be achieved by other calculation methods.

Firstly, variables $m_n$, $offset_n$, $m_n'$, $offset_n'$, $t_v$, and $t_A$ are defined in the following manner.

$m_n$: the number of video data pieces encoded by the first unit from a beginning of video data pieces corresponding to a first record instruction to an end of the video data pieces corresponding to an nth record instruction accumulated in the buffer for video 402 offset$_n$: an amount of accumulated offset immediately before a trailing edge of audio data pieces corresponding to the nth record instruction is determined m$_n$': the number of video data pieces encoded by the first unit from the beginning of the video data pieces corresponding to the first record instruction to immediately before the video data pieces corresponding to the nth record instruction are started that are accumulated in the buffer for video 402 offset$_n$': an amount of accumulated offset immediately before a leading edge of audio data pieces corresponding to the nth record instruction is determined t$_v$: a time length of the first unit t$_A$: a time length of the second unit For example, using the above example, when n=2, m$_2$ is equivalent to the number of video data pieces encoded by the first unit from the video data piece 100 to the video data piece 105, and offset$_2$ is equivalent to the above Offset2. Additionally, using the above example, when n=2, m$_2$' is equivalent to the number of video data pieces encoded by the first unit from the video data piece 100 to the video data piece 103, and offset$_2$' is equivalent to the above Offset1. In this exemplary embodiment, t$_v$=499.5 milliseconds and t$_A$=32 milliseconds.

The multiplexing unit 405 performs the above calculation and determines a trailing edge of the audio data pieces corresponding to the nth record instruction.

The multiplexing unit 405 obtains a quotient q$_n$ as shown in the following formula (1). Note that q$_n$ is an integer value with decimal points rounded down.

$$q_n = (m_n \times t_v - \text{offset}_n)/t_A \quad (1)$$

As shown by the following formula (2), the multiplexing unit 405 obtains a remainder r$_n$. In the formula (2), "%" indicates a remainder operator.

$$r_n = (m_n \times t_v - \text{offset}_n) \% t_A \quad (2)$$

When r$_n$=0 is satisfied, the multiplexing unit 405 determines a q$_n$th audio data piece encoded by the second unit, which is counted from the leading edge of the audio data pieces corresponding to the first record instruction, to be the trailing edge of the audio data pieces corresponding to the nth record instruction. When r$_n$=0 is not satisfied, and the following formula (3) is satisfied, the multiplexing unit 405 determines a q$_n$th audio data piece encoded by the second unit, which is counted from the leading edge of the audio data pieces corresponding to the first record instruction, to be the trailing edge of the audio data pieces corresponding to the nth record instruction. When r$_n$=0 is not satisfied, and the following formula (3) is not satisfied, the multiplexing unit 405 determines a q$_n$+1th audio data piece encoded by the second unit, which is counted from the leading edge of the audio data corresponding to the first record instruction, to be the trailing edge of the audio data corresponding to the nth record instruction.

$$(m_n \times t_v) < (q_n \times t_A + t_A/2 + \text{offset}_n) \quad (3)$$

Further, the multiplexing unit 405 performs the following calculation to determine the leading edge of the audio data pieces corresponding to the nth record instruction.

As shown in the following formula (4), the multiplexing unit 405 obtains a quotient q$_n$'. Note that q$_n$' is an integer value with decimal points rounded down.

$$q_n' = (m_n' \times t_v - \text{offset}_n')/t_A \quad (4)$$

As shown in the following formula (5), the multiplexing unit 405 obtains a remainder r$_n$'. In the formula (5), "%" indicates a remainder operator.

$$r_n' = (m_n' \times t_v - \text{offset}_n') \% t_A \quad (5)$$

When r$_n$'=0 is satisfied, the multiplexing unit 405 determines a q$_n$'+1th audio data piece encoded by the second unit, which is counted from the leading edge of the audio data pieces corresponding to the first record instruction, to be the trailing edge of the audio data pieces corresponding to the nth record instruction. When r$_n$'=0 is not satisfied, and the following formula (6) is satisfied, the multiplexing unit 405 determines a q$_n$'+1th audio data piece encoded by the second unit, which is counted from the leading edge of the audio data pieces corresponding to the first record instruction, to be the trailing edge of the audio data pieces corresponding to the nth record instruction. When r$_n$'=0 is not satisfied, and the following formula (6) is not satisfied, the multiplexing unit 405 determines a q$_n$'+2th audio data piece encoded by the second unit, which is counted from the leading edge of the audio data pieces corresponding to the first record instruction, to be the trailing edge of the audio data pieces corresponding to the nth record instruction.

$$(m_n \times t_v) <= (q_n \times t_A + t_A/2 + \text{offset}_n) \quad (6)$$

The process for selecting data pieces to be multiplexed by the multiplexing unit 405 has been described above.

When the multiplexing is compliant with MPEG-TS, temporal information for reproduction included in the record data generated in the clip continuous recording needs to be continuous. To that end, the multiplexing unit 405 corrects PTS (Presentation Time Stamp) and DTS (Decoding Time Stamp), which are the temporal information for reproduction, of video data pieces corresponding to the record instructions of the second record instruction onward in such a way that the temporal information of the video data pieces to be multiplexed will become continuous. Further, the multiplexing unit 405 corrects PTS of the audio data pieces corresponding to the respective record instruction of the second record instruction onward in such a way that the temporal information of the audio data pieces to be multiplexed will become continuous.

The present invention is not limited to the above exemplary embodiments, and various modification can be made as appropriate without departing from the scope of the present invention. For example, in the above exemplary embodiment, although the video encoding unit 401 continues the encoding and accumulates data pieces in the buffer for video regardless of the record stop instruction during the clip continuous recording, the encoding may be suspended at each record stop instruction. In such a case, the data pieces to be multiplexed can be selected in a similar manner to that of the above exemplary embodiment by, for example, counting how many time lengths for the video data pieces by the first unit of data are included in the time length corresponding to the period in which the encoding is suspended. Moreover, while the video encoding is suspended, the imaging unit 10 may stop obtaining video data.

Further, the present invention can be applied to the multiplexing of the compressed and encoded video data and compressed and encoded audio data in the clip continuous recording, and the format of the multiplexing is not limited. For example, in the above exemplary embodiment, although an example is given in which the multiplexing is performed in accordance with MPEG-TS, the multiplexing may be performed in accordance with other formats such as MPEG-PS (Program Stream).

When any of the components of the imaging device 1 is achieved by a computer executing a program, the program can be stored and provided to the computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

What is claimed is:

1. A recording device comprising:
   a non-transitory computer readable media configured to store instructions;
   at least one processor operably coupled to the non-transitory computer readable media and configured to execute the instructions to:
   compress and then encode video data pieces by a first unit of data;
   compress and then encode audio data pieces in a second unit of data, a time length of the second unit of data being different from that of the first unit of data; and
   when a pair of record instructions made up of a record start instruction and a record stop instruction is repeatedly provided at time intervals, couple the respective video data pieces, which have been encoded, corresponding to a period from the record start instruction to the record stop instruction, and also multiplex the respective video data pieces with the audio data pieces, which have been encoded and which correspond to the respective video data pieces, as one piece of record data, wherein
   the encoding of audio data pieces continues at least from a first one of the record instruction until a last one of the record instruction,
   determine a leading edge of the audio data piece that has been shifted in time by an amount of offset, which has been accumulated, in such a way that, when a starting point of the encoded video data pieces corresponding to a focused record instruction is used as a first reference point, a difference between a starting point of the audio data piece encoded by the second unit of data of the leading edge of the encoded audio data pieces corresponding to the focused record instruction and the first reference point will become less than or equal to half of the time length of the second unit of data,
   determine a trailing edge of the audio data piece that has been shifted in time by the amount of offset, which has been accumulated, in such a way that, when an ending point of the encoded video data pieces corresponding to the focused record instruction is used as a second reference point, a difference between an ending point of the audio data piece encoded by the second unit of data of the trailing edge of the encoded audio data pieces corresponding to the focused record instruction and the second reference point will become less than or equal to the half of the time length of the second unit of data,
   an initial value of the amount of offset is a difference between a leading edge of the encoded video data pieces and a leading edge of the encoded audio data pieces at the time of starting a first record, every time the leading edge of the encoded audio data pieces corresponding to the focused record instruction is determined, a difference between a time length from a point corresponding to a first one of the record start instruction to the determined leading edge and a time length from the point corresponding to the first one of the record start instruction to the first reference point is added to the amount of offset, and every time the trailing edge of the encoded audio data pieces corresponding to the focused record instruction is determined, a difference between a time length from the point corresponding to the first one of the record start instruction to the determined trailing edge and a time length from the point corresponding to the first one of the record start instruction to the second reference point is added to the amount of offset, and
   select the audio data pieces by the second unit of data from the audio data pieces, which have been encoded, in such a way that an amount of temporal shift between the respective video data pieces and the audio data pieces, which have been encoded and which correspond to the respective video data pieces, will become less than or equal to the time length of the second unit of data and then multiplexes the selected audio data pieces with the video data pieces.

2. The recording device according to claim 1, wherein the video encoding continues the encoding at least from the first one of the record instruction until the last one of the record instruction.

3. The recording device according to claim 1, wherein the video encoding is not performed between the respective record instructions.

4. The recording device according to claim 1, wherein the multiplexing is in accordance with MPEG-TS.

5. A multiplexing method comprising:
   compressing and then encoding video data pieces by a first unit of data;
   compressing and then encoding audio data pieces by a second unit of data, a time length of the second unit of data being different from that of the first unit of data; and
   when a pair of record instructions made up of a record start instruction and a record stop instruction is repeatedly provided at time intervals, coupling the respective encoded video data pieces corresponding to a period from the record start instruction to the record stop instruction, and also multiplexing the respective video data pieces with the encoded audio data pieces corresponding to the respective video data pieces as one piece of record data, wherein
   the encoding of audio data pieces is continued at least from a first one of the record instruction until a last one of the record instruction,
   determining a leading edge of the audio data piece that has been shifted in time by an amount of offset, which has been accumulated, in such a way that, when a starting point of the encoded video data pieces corresponding to a focused record instruction is used as a first reference point, a difference between a starting point of the audio data piece encoded by the second unit of data of the leading edge of the encoded audio data pieces corresponding to the focused record instruction and the first reference point will become less than or equal to half of the time length of the second unit of data, determining a trailing edge of the audio data piece that has been shifted in time by the amount of offset, which has been accumulated, in such a way that, when an ending point of the encoded video data pieces corresponding to the focused record instruction is used as a second reference point, a difference between an ending point of the audio data piece encoded by the second unit of data of the trailing edge of the encoded audio data pieces corresponding to the focused record instruction and the second reference point will become less than or equal to the half of the time length of the second unit of data, an initial value of the amount of offset is a difference between a leading edge of the encoded video data pieces and a leading edge of the encoded audio data pieces at the time of starting a first record, every time the leading edge of the encoded audio data pieces corresponding to the focused record instruction is determined, a difference between a time length from a point corresponding to a first one of the record start instruction to the determined leading edge and a time length from the point corresponding to the first one of the record start instruction to the first reference point is added to the amount of offset, and every time the trailing edge of the encoded audio data pieces corresponding to the focused record instruction is determined, a difference between a time length from the point corresponding to the first one of the record start instruction to the determined trailing edge and a time length from the point corresponding to the first one of the record start instruction to the second reference point is added to the amount of offset, and selecting the audio data pieces by the second unit of data from the encoded audio data pieces in such a way that an amount of temporal shift between the respective video data pieces and the audio data pieces, which have been encoded in the audio encoding and which correspond to the respective video data pieces, will become less than or equal to the time length of the second unit of data and then the selected audio data pieces are multiplexed with the video data pieces.

\* \* \* \* \*